US012576990B2

(12) United States Patent
Leitch et al.

(10) Patent No.: US 12,576,990 B2
(45) Date of Patent: Mar. 17, 2026

(54) PREDICTIVE MAINTENANCE MODEL DESIGN SYSTEM

(71) Applicant: The Boeing Company, Chicago, IL (US)

(72) Inventors: Robert Michael Leitch, Vancouver (CA); Yikan Wang, Burnaby (CA)

(73) Assignee: The Boeing Company, Arlington, VA (US)

( * ) Notice: Subject to any disclaimer, the term of this patent is extended or adjusted under 35 U.S.C. 154(b) by 1052 days.

(21) Appl. No.: 17/378,678

(22) Filed: Jul. 17, 2021

(65) Prior Publication Data

US 2022/0027762 A1     Jan. 27, 2022

Related U.S. Application Data

(60) Provisional application No. 63/055,289, filed on Jul. 22, 2020.

(51) Int. Cl.
| | |
|---|---|
| *B64F 5/60* | (2017.01) |
| *B64F 5/40* | (2017.01) |
| *G05B 23/02* | (2006.01) |
| *G06N 5/04* | (2023.01) |

(Continued)

(52) U.S. Cl.
CPC .................. *B64F 5/40* (2017.01); *B64F 5/60* (2017.01); *G05B 23/0216* (2013.01); *G05B 23/0235* (2013.01); *G05B 23/024* (2013.01); *G05B 23/0281* (2013.01); *G05B 23/0283* (2013.01);

(Continued)

(58) Field of Classification Search
None
See application file for complete search history.

(56) References Cited

U.S. PATENT DOCUMENTS

| | | | |
|---|---|---|---|
| 6,617,972 | B2 | 9/2003 | Takarada et al. |
| 7,230,527 | B2 | 6/2007 | Basu et al. |
| 7,349,825 | B1 | 3/2008 | Williams et al. |

(Continued)

FOREIGN PATENT DOCUMENTS

| | | |
|---|---|---|
| WO | 0131579 A2 | 5/2001 |
| WO | 2021059302 A2 | 4/2021 |

OTHER PUBLICATIONS

U.S. Patent and Trademark Office, Final Office Action regarding U.S. Appl. No. 17/020,560, dated Jan. 31, 2023, 13 pages.

(Continued)

*Primary Examiner* — Kamran Afshar
*Assistant Examiner* — Steven Phung
(74) *Attorney, Agent, or Firm* — Harrity & Harrity, LLP

(57) ABSTRACT

A data processing system for generating predictive maintenance models is disclosed, including one or more processors, a memory including one or more digital storage devices, and a plurality of instructions stored in the memory. The instructions are executable by the one or more processors to receive a historical dataset relating to each system of a plurality of systems, the historical dataset including maintenance data and operational data. The instructions are further executable to receive a rule set for processing a first attribute of the operation data and calculate a custom data feature from the historical dataset according to the received rule set. The instructions are further executable to generate a predictive maintenance model, using the custom data feature according to a machine learning method.

20 Claims, 6 Drawing Sheets

(51) Int. Cl.
  *G06N 20/00* (2019.01)
  *G06Q 10/20* (2023.01)
(52) U.S. Cl.
  CPC ............... *G06N 5/04* (2013.01); *G06N 20/00*
    (2019.01); *G06Q 10/20* (2013.01)

(56) References Cited

U.S. PATENT DOCUMENTS

| | | | |
|---|---|---|---|
| 7,621,193 B2 | 11/2009 | Fay et al. | |
| 8,040,243 B2 | 10/2011 | Bommer et al. | |
| 8,054,092 B2 | 11/2011 | Fay et al. | |
| 8,138,773 B2 | 3/2012 | Fay et al. | |
| 8,237,548 B2 | 8/2012 | Fay et al. | |
| 8,620,714 B2 | 12/2013 | Williams et al. | |
| 8,779,729 B2 | 7/2014 | Shiraishi | |
| 9,002,722 B2 | 4/2015 | Helms et al. | |
| 9,002,775 B1 | 4/2015 | Harrison et al. | |
| 9,349,230 B1* | 5/2016 | Doyen ..................... | G07C 9/38 |
| 9,619,881 B2 | 4/2017 | Maddah et al. | |
| 9,633,171 B2 | 4/2017 | McNair | |
| 9,655,564 B2 | 5/2017 | Sternickel et al. | |
| 9,659,087 B2 | 5/2017 | Cazzanti et al. | |
| 10,062,053 B1 | 8/2018 | Oakley et al. | |
| 10,268,948 B1 | 4/2019 | Warn et al. | |
| 10,317,870 B1 | 6/2019 | Burnett et al. | |
| 10,401,319 B2 | 9/2019 | Mitchell et al. | |
| 10,776,760 B2 | 9/2020 | Ethington et al. | |
| 10,963,491 B2 | 3/2021 | Weinstein et al. | |
| 11,410,056 B1 | 8/2022 | Xu et al. | |
| 2006/0144997 A1 | 7/2006 | Schmidt et al. | |
| 2007/0114422 A1 | 5/2007 | Berkcan et al. | |
| 2008/0215513 A1 | 9/2008 | Weston et al. | |
| 2010/0262901 A1 | 10/2010 | Disalvo | |
| 2011/0184743 A1 | 7/2011 | Trollman | |
| 2012/0098518 A1 | 4/2012 | Unagami et al. | |
| 2012/0271748 A1 | 10/2012 | Disalvo | |
| 2014/0278713 A1 | 9/2014 | Zivelin et al. | |
| 2016/0140584 A1 | 5/2016 | Moghtaderi | |
| 2016/0178714 A1 | 6/2016 | Fautz | |
| 2016/0358099 A1 | 12/2016 | Sturlaugson et al. | |
| 2016/0371600 A1* | 12/2016 | Svensen ................... | G06N 7/01 |
| 2017/0097860 A1 | 4/2017 | Pang | |
| 2017/0166328 A1 | 6/2017 | Ethington et al. | |
| 2017/0193372 A1 | 7/2017 | Schimert | |
| 2017/0308802 A1 | 10/2017 | Ramsoy et al. | |
| 2017/0319097 A1 | 11/2017 | Amthor et al. | |
| 2017/0364831 A1 | 12/2017 | Ghosh et al. | |
| 2018/0024214 A1 | 1/2018 | Bhat et al. | |
| 2018/0202959 A1 | 7/2018 | Mitchell et al. | |
| 2019/0048740 A1 | 2/2019 | Agarwal et al. | |
| 2019/0092495 A1 | 3/2019 | Lu et al. | |
| 2019/0156298 A1 | 5/2019 | Ethington et al. | |
| 2019/0187685 A1 | 6/2019 | Cella et al. | |
| 2019/0289125 A1* | 9/2019 | Mosenia ........... | H04M 1/72454 |
| 2019/0303496 A1 | 10/2019 | Weinstein et al. | |
| 2020/0134369 A1 | 4/2020 | Chopra et al. | |
| 2020/0225655 A1 | 7/2020 | Cella et al. | |
| 2020/0233571 A1* | 7/2020 | Yuravlivker .......... | G06F 16/245 |
| 2020/0250905 A1 | 8/2020 | Sundareswara et al. | |
| 2020/0293940 A1 | 9/2020 | Chopra et al. | |
| 2020/0311853 A1* | 10/2020 | Falde ..................... | B23K 31/02 |
| 2020/0331636 A1 | 10/2020 | Mulholland et al. | |
| 2020/0372561 A1* | 11/2020 | Sanghavi ................. | G06N 5/04 |
| 2020/0379454 A1* | 12/2020 | Trinh ................... | G05B 23/024 |
| 2020/0410459 A1 | 12/2020 | Ethington et al. | |
| 2021/0004284 A1 | 1/2021 | Vah et al. | |
| 2021/0096927 A1 | 4/2021 | Zhu et al. | |
| 2021/0224833 A1 | 7/2021 | Lei et al. | |
| 2021/0277906 A1 | 9/2021 | Megchiani et al. | |
| 2022/0051198 A1 | 2/2022 | Thakkar et al. | |

OTHER PUBLICATIONS

Confusion Matrix, https://en.wikipedia.org/wiki/Confusion_matrix, last edited Apr. 9, 2024, 4 pages.

U.S. Patent and Trademark Office, Non-Final Office Action regarding U.S. Appl. No. 17/378,677, dated May 17, 2024, 80 pages.

Mofokeng et al., Analysis of aircraft maintenance processes and cost, 2020, Elsevier, B.V., 27th CIRP Life Cycle Engineering (LCE) Conference, CIRP 90, pp. 467-472.

U.S. Patent and Trademark Office, Non-Final Office Action regarding U.S. Appl. No. 17/378,674, dated Mar. 9, 2023, 41 pages.

Delua, Julianna, "Supervised vs. Unsupervised Learning: What's the Difference?", Mar. 12, 2021, IBM Blog, 7 pgs.

U.S. Patent and Trademark Office, Non-Final Office Action regarding U.S. Appl. No. 17/020,560, dated Aug. 25, 2023, 9 pages.

U.S. Patent and Trademark Office, Final Office Action regarding U.S. Appl. No. 17/378,674, dated Aug. 31, 2023, 28 pages.

U.S. Patent and Trademark Office, Final Office Action regarding U.S. Appl. No. 17/378,676, dated Apr. 28, 2023, 39 pages.

U.S. Patent and Trademark Office, Non-Final Office Action regarding U.S. Appl. No. 17/378,676, dated Sep. 8, 2022, 38 pages.

U.S. Patent and Trademark Office, Non-Final Office Action regarding U.S. Appl. No. 17/020,560, dated Sep. 22, 2022, 14 pages.

* cited by examiner

110

| INTEGRATE OPERATIONAL AND MAINTENANCE DATA, GENERATE FEATURES | → | VISUALIZE AND ANALYZE DATA, RECEIVE FEATURE SELECTION | → | GENERATE A PREDICTIVE MAINTENANCE MODEL | → | IMPLEMENT THE PREDICTIVE MAINTENANCE MODEL |
|---|---|---|---|---|---|---|
| 112 | | 114 | | 116 | | 118 |

FIG. 1

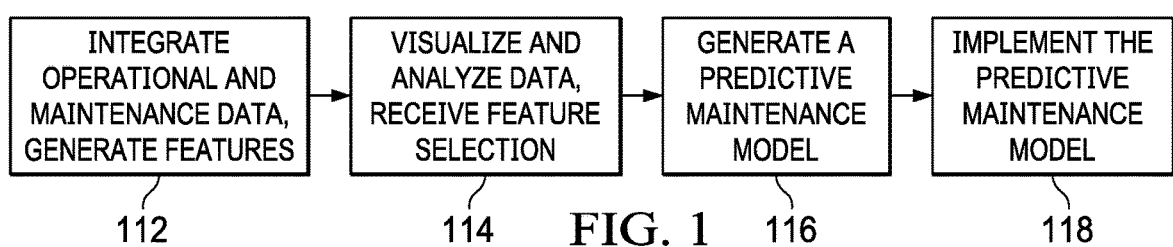

200

210

REMOTE SERVER

233 — DATA FEATURES AND LABELS

MODEL — 234

216 — EXPLORATION MODULE

218 — MACHINE LEARNING MODULE

220 — IMPLEMENTATION MODULE

214

LOCAL COMPUTER

| MAINTENANCE DATA | SENSOR DATA | GUI 226 | NEW SENSOR DATA | ALERTS |
|---|---|---|---|---|
| 222 | 224 | | 230    212 | 232 |

FIG. 2

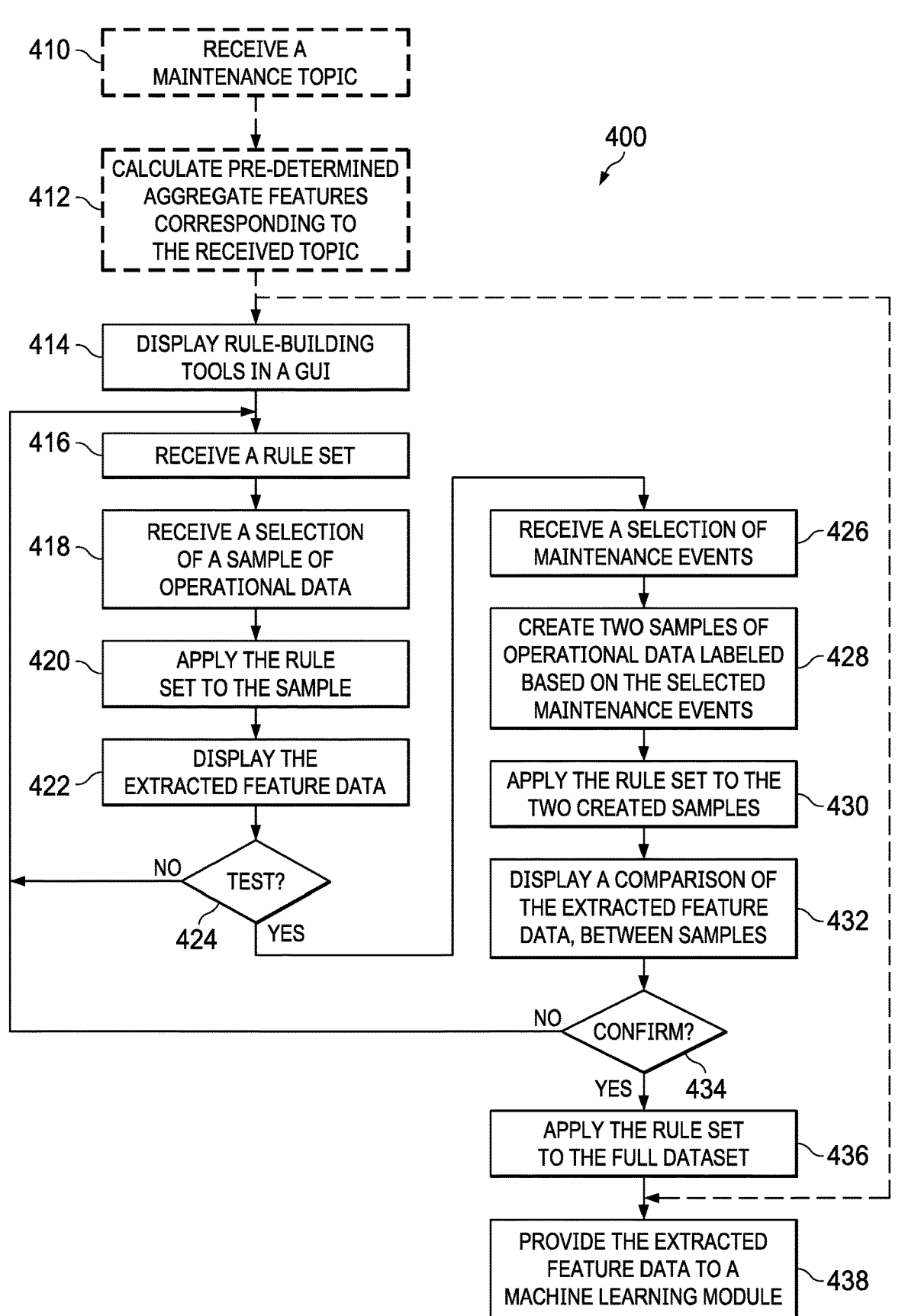

410 — RECEIVE A MAINTENANCE TOPIC

412 — CALCULATE PRE-DETERMINED AGGREGATE FEATURES CORRESPONDING TO THE RECEIVED TOPIC

400

414 — DISPLAY RULE-BUILDING TOOLS IN A GUI

416 — RECEIVE A RULE SET

418 — RECEIVE A SELECTION OF A SAMPLE OF OPERATIONAL DATA

420 — APPLY THE RULE SET TO THE SAMPLE

422 — DISPLAY THE EXTRACTED FEATURE DATA

424 — TEST?  NO  YES

426 — RECEIVE A SELECTION OF MAINTENANCE EVENTS

428 — CREATE TWO SAMPLES OF OPERATIONAL DATA LABELED BASED ON THE SELECTED MAINTENANCE EVENTS

430 — APPLY THE RULE SET TO THE TWO CREATED SAMPLES

432 — DISPLAY A COMPARISON OF THE EXTRACTED FEATURE DATA, BETWEEN SAMPLES

434 — CONFIRM?  NO  YES

436 — APPLY THE RULE SET TO THE FULL DATASET

438 — PROVIDE THE EXTRACTED FEATURE DATA TO A MACHINE LEARNING MODULE

FIG. 4

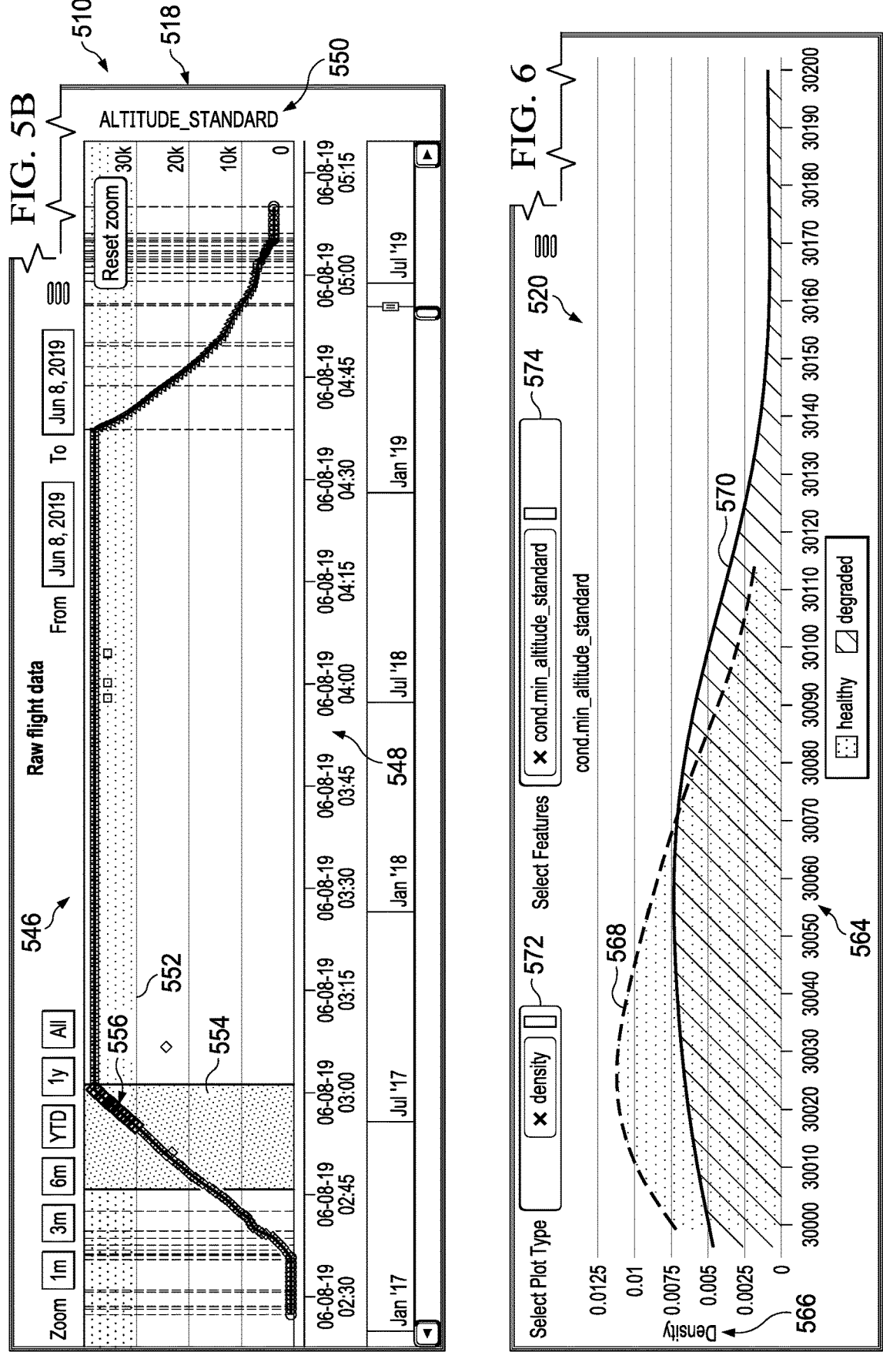

PREDICTIVE MAINTENANCE MODEL DESIGN SYSTEM

CROSS-REFERENCES

This application claims the benefit under 35 U.S.C. § 119(e) of the priority of U.S. Provisional Patent Application Ser. No. 63/055,289, filed Jul. 22, 2020, the entirety of which is hereby incorporated by reference for all purposes.

BACKGROUND

Data are routinely collected by engineers on both maintenance and operation of equipment such as the aircraft of an airline's fleet, and can offer valuable insights into future performance and potential repair needs. However, the complexity and sheer quantity of the collected data renders much useful analysis beyond the skills of a typical safety or maintenance engineer. Even for trained engineering analysts with the requisite specialist skills the process can be time consuming and laborious using typical software tools such as Excel® or Tableau®.

Machine learning is an increasingly popular tool for utilizing and interpreting such large datasets, but may be out of reach for a typical safety or maintenance engineer. Effective application of machine learning techniques to a maintenance problem typically requires identification of a relevant data pattern or pre-cursor signature, as well as expertise in data science to select and tune an appropriate algorithm, and programming skills to implement training and evaluation of the algorithm to generate a predictive model.

Augmented analytics and software tools to assist in the data analysis and model design process are desirable, to bring the power and insights of trend analysis and predictive models to a broader range of users, and simplify and accelerate the process for experienced analysts and data scientists.

SUMMARY

The present disclosure provides systems, apparatus, and methods relating to predictive maintenance model design. In some examples, a data processing system for generating predictive maintenance models may include one or more processors, a memory including one or more digital storage devices, and a plurality of instructions stored in the memory. The instructions may be executable by the one or more processors to receive a historical dataset relating to each system of a plurality of systems, the historical dataset including maintenance data and operational data. The instructions may be further executable to receive a rule set for processing a first attribute of the operation data and calculate a custom data feature from the historical dataset according to the received rule set. The instructions may be further executable to generate a predictive maintenance model, using the custom data feature according to a machine learning method.

In some examples, a computer implemented method of generating a predictive maintenance model may include receiving a historical dataset relating to each system of a plurality of systems, the historical dataset including maintenance data and operational data. The method may further include receiving a rule set for processing a first attribute of the operation data and calculate a custom data feature from the historical dataset according to the received rule set. The method may further include generating a predictive maintenance model, using the custom data feature according to a machine learning method.

In some examples, a computer program product for generating predictive maintenance models may include a non-transitory computer-readable storage medium having computer-readable program code embodied in the storage medium, the computer-readable program code configured to cause a data processing system to generate a predictive maintenance model. The code may include at least one instruction to receive a historical dataset relating to each system of a plurality of systems, the historical dataset including maintenance data and operational data. The code may further include at least one instruction to receive a rule set for processing a first attribute of the operation data and calculate a custom data feature from the historical dataset according to the received rule set. The code may further include at least one instruction to generate a predictive maintenance model, using the custom data feature according to a machine learning method.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 1 is a flow chart depicting steps of an illustrative predictive maintenance model design process in accordance with aspects of the present disclosure.

FIG. 2 is a schematic diagram of an illustrative predictive maintenance model design system.

FIG. 4 is a flow chart depicting steps of an illustrative computer implemented method of custom data feature creation.

FIG. 5B is a diagram of a fourth pane of the GUI of FIG. 5A.

FIG. 6 is a diagram of a comparison plot of the GUI of FIG. 5A.

DETAILED DESCRIPTION

Figure 3:
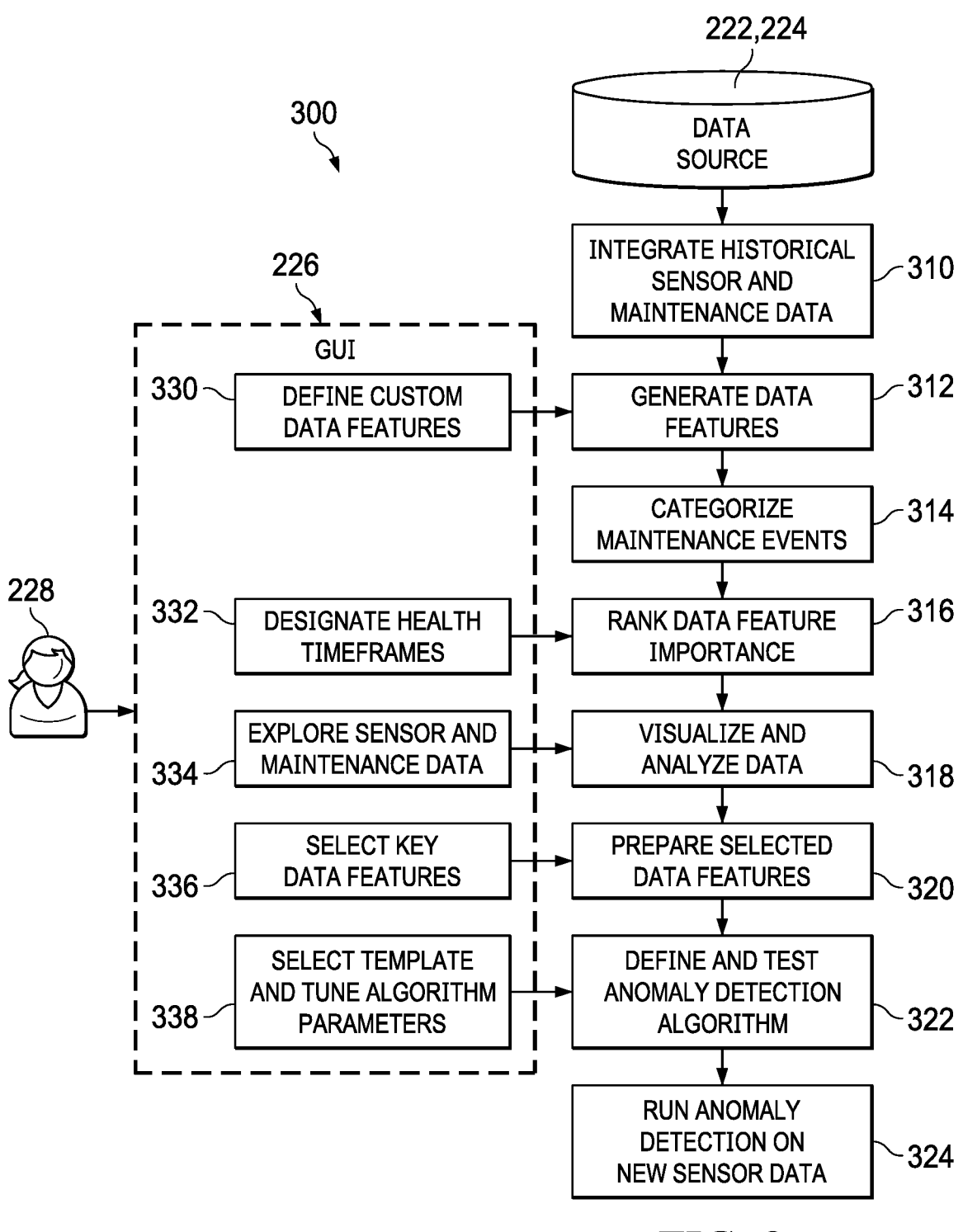
FIG. 3 is a flow chart depicting steps of another illustrative predictive maintenance model design process in accordance with aspects of the present disclosure.

Various aspects and examples of a predictive maintenance model design system including a custom data feature creation module, as well as related systems and methods, are described below and illustrated in the associated drawings. Unless otherwise specified, a design system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a predictive maintenance model design system may be configured to assist a user in discovering and interpreting data trends and patterns, designing and training a prediction algorithm, and/or implementing a generated predictive maintenance model. For example, the design system may be a data processing system and/or a software program configured to execute a process 110, as shown in FIG. 1, to generate a machine learning model for predicting maintenance requirements of a system based on historical maintenance and operational data of a plurality of systems by detecting predictive anomalies in ongoing operational data.

At step 112 process 110 includes integrating operational and maintenance data, and generating data features. The integration may include receiving at least two distinct datasets for a plurality of systems such as a fleet of aircraft, and combining the data to form a single historical dataset. The datasets may be stored in the memory of the processing system on which process 110 is executed, may be available on a server for access over a network of some kind, or may be received by any effective means. In some examples, data may be drawn from multiple databases and/or from disparate sources.

Integrating the data may also include pre-processing or modification to prepare the data for use. The dataset may include numerical values organized as attributes of a plurality of maintenance and/or repair records and a plurality of telemetry and/or sensor records for each of a plurality of systems (e.g., aircraft). Raw attribute data from the telemetry records may be processed to generate one or more operational data features. The data features may be an unaltered attribute, may be a statistical function of an attribute, and/or may be an aggregate of multiple attributes or records.

At step 114, process 110 includes visualizing and analyzing the historical dataset, and receiving a selection of operational data features. The visualization may include displaying a variety of graphs, charts, plots, and tables in a graphical user interface (GUI) along with a plurality of interactive elements. Raw maintenance and operational data from the historical dataset, generated data features, and/or results of analysis of the dataset may be visualized. A user such as an engineering analyst may use the visualizations to identify trends in the sensor data that are indicative of equipment degradation and failure. Facilitating rapid identification of signs of deviation from normal operation by such an analysis is desirable in order to allow efficient generation of useful predictive models.

The interactive elements of the GUI may be configured to allow input of constraints on what data is visualized, initiation of desired analysis, and selection of operational data features. For example, the GUI may include selection boxes or buttons, display of contextual information on cursor hover, drill-down from graphs to tables or from complete dataset to data subsets, a refresh trigger, a mathematical function input, and/or any GUI elements known to those skilled in the art of software design.

At step 116, process 110 includes generating a predictive maintenance model based on the selected operational data features. Model generation may include selection of an appropriate anomaly detection algorithm, and input of algorithm parameters. In some examples, one or more algorithm templates may be presented in the GUI. In some examples, a plurality of logic block elements may be placeable in an interactive workflow building environment to define an appropriate algorithm and parameters.

Generating the predictive maintenance model may further include training and testing the selected algorithm. The algorithm may be trained and evaluated one or more times, and detailed test results displayed in the GUI. A selection of an algorithm configuration exhibiting desired properties may be received. The selected algorithm configuration may then be used to train a final model on the full historical dataset.

At step 118, the process includes implementing the generated predictive maintenance model. In some examples, the generated model may be prepared for deployment by software and/or a data processing system separate from the predictive maintenance model design system used to execute process 110. In such examples, the generated model may be prepared for deployment as part of a software program, or may be converted to an accessible format, e.g., including an application programming interface (API).

In some examples, implementing the generated predictive maintenance model may include receiving additional operational data. For instance, additional flight data may be recorded by an aircraft fleet and input to the predictive maintenance model design system running process 110. The predictive maintenance model may be applied to the additional operational data, and generate alerts for detected anomalies. Based on the generated alerts, proactive and preventative maintenance action such as inspection, testing, repair, or replacement of equipment, may be taken by maintenance workers to avoid potential costly and disruptive unplanned component replacements or other undesirable maintenance events.

Process 110 may be repeated to generate additional predictive maintenance models. For example, a suite of predictive maintenance models may be generated for an aircraft fleet. Over time, additional models may be generated or re-generated based on new data and/or to address new maintenance challenges.

Aspects of a predictive maintenance model design system or design process such as process 110 may be embodied as a computer implemented method, computer system, or computer program product. Accordingly, aspects of a predictive maintenance model design system may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the predictive maintenance model design system may take the form of a computer program product embodied in a computer-readable medium (or media) having computer-readable program code/instructions embodied thereon. The computer-readable program code may be configured to cause a data processing system to generate a predictive maintenance model.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a cloud-based storage service, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of a predictive maintenance model design process may be written in one or any combination of programming languages, including an object-oriented programming language such as Java®, Smalltalk®, C++®, Python®, and/or the like, and conventional procedural programming languages, such as C.

Mobile apps may be developed using any suitable language, including those previously mentioned, as well as Objective-C®, Swift®, C#, HTML5, and the like.

The program code may execute entirely on a user's computer, partly on the user's computer, as a stand-alone software package, partly on the user's computer and partly on a remote computer, or entirely on the remote computer or server. In the latter scenario, the remote computer or server may be connected to the user's computer through any type of network, including a local area network (LAN) or a wide area network (WAN), and/or the connection may be made to an external computer (for example, through the Internet using an Internet Service Provider). The remote computer or server may be part of a cloud-based network architecture, such as a cloud computing service or platform. In some examples, the program code may be executed in a software-as-a-service (SaaS) framework accessed by a file transfer protocol such as secure shell file transfer protocol (SFTP) and/or an internet browser on the user's computer.

Aspects of the predictive maintenance design system are described below with reference to flowchart illustrations and/or block diagrams of methods, apparatus, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the predictive maintenance design system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary predictive maintenance model design systems and feature creation modules as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Predictive Maintenance Model Design System

As shown in FIGS. 2 and 3, this section describes an illustrative system 200, configured to execute a design and implementation process 300. System 200 is an example of a predictive maintenance model design system, as described above. Design and implementation process 300 is an example of process 110, also as described above.

System 200 is configured to assist a user in completing process 300 to generate and implement machine learning models to detect anomalies in operational data which are indicative of future maintenance events. In the present example, system 200 is designed to generate models for a fleet of aircraft, based on recorded flight data. In some examples, system 200 may additionally or alternatively be used for predictive maintenance with respect to other mechanical systems, such as ground vehicles, ships, manufacturing equipment, industrial appliances, etc.

System 200 may be used to prepare models relating to different aspects (e.g., components or systems) of aircraft, and one set of historical data may be used to prepare multiple different models. For example, system 200 may be used to prepare a model for each of multiple subsystems present in an aircraft, to prepare a model for each class of sensor recording flight data, or to prepare a model for each failure mode of a particular component.

FIG. 2 is a schematic diagram depicting a remote server 210 and a local computer 212 on which design system 200 is executed. The server and/or computer may be an example of data processing system 700 as described in Example C, below. The server and local computer communicate, or exchange information, over a network 214 such as the internet. Multiple modules of system 200 are run on remote server 210. The modules may comprise, for example, instructions and/or data stored in a memory and executed by a processor. The modules, which may also be referred to as programs or processes, include an exploration module 216, a machine learning module 218, and an implementation module 220.

Modules 216, 218, 220 may be described as performing steps 310-324 of process 300, in cooperation with a user 228 who performs steps 330-338 of the process, as depicted in FIG. 3. Process 300 may also be described entirely as steps performed by modules 216, 218, 220 including receiving inputs from user 228 as described in steps 330-338.

User 228 interacts with the modules of system 200 on remote server 210 through a graphical user interface (GUI) 226 on local computer 212. The user is guided through a data exploration and model design process by the GUI, then a generated model is implemented by remote server 210 on new operational data to return anomaly alerts. New operational data may be input and alerts returned on an ongoing basis.

In the present example, GUI 226 is executed by local computer 212. For instance, the user may access the GUI through an internet browser installed on the local computer, or system 200 may include a client-side program running on the local computer and displaying the GUI. In general, a user may interface with system 200 in any manner allowing effective display and input of information.

System 200 may be configured to facilitate exploration of multiple maintenance events of interest, investigation of multiple trends concurrently, design of multiple algorithms, and/or use by multiple users of local computer 212 through, for example, creation of multiple distinct sessions. Process 300 may be performed or repeated independently in each such session, and/or information such as data features, analysis results, or algorithm configurations may be accessible and/or selectively shared between sessions.

Exploration module 216 receives historical data from a maintenance data source 222 and a sensor or operational data source 224. In some examples, the module may receive historical data from a plurality of maintenance and/or operational data sources. Typically, flight data are recorded by airplane sensors and downloaded in large data sets post flight. In some examples, sensor data may additionally or alternatively be downloaded during a flight using a system such as Aircraft Communications Addressing and Reporting System (ACARS). Separately, airline maintenance teams maintain information logs, recording maintenance events, defects, and actions taken, using maintenance information systems in an airline back-office. These two information sources, flight data and maintenance data, are not integrated. However, in order to perform predictive maintenance analyses, flight data patterns over time may need to be compared with the occurrence of maintenance events.

To address this, exploration module 216 may integrate the datasets for analysis and visualization. Step 310 of process 300 includes integrating the historical maintenance and sensor data. The data may be integrated into a single historical dataset and prepared for display and analysis. For example, the data may be received from other software and may be converted from an output format of such software to a format appropriate to modules 216, 218 and 220. Preprocessing algorithms may be applied to the dataset to discretize continuous variables, reduce dimensionality, separate measurements into components, eliminate missing or inaccurate data, and/or any appropriate modifications. When the dataset includes data from multiple sources, pre-processing may include merging data, harmonizing formatting, and matching organizational structure.

Exploration module 216 is configured to integrate data saved locally to computer 212 (e.g., repair logs saved as spreadsheets and/or in a repair management software database). In some examples, the exploration module may also be configured to interface or communicate with external databases or database software to retrieve relevant data. For example, the exploration module may generate SQL queries to request data from an online database. Such connectivity may facilitate access to complete and up-to-date information. The module may also be configured to accept input of data in any anticipated format.

At step 312, exploration module 216 generates data features from the operational data of the historical dataset, including phase-dependent aggregate data features. Trending of recorded sensor data can be difficult due to large variations in sensor values that occur as a result of equipment operational cycles. For example, if an analyst simply aggregates the time series recordings for many aircraft flights into one large time series, and plots this data over long periods to look for a trend over time, the result is typically a very noisy distribution with no significant trends evident.

Digitally recorded sensor data, e.g. temperatures, pressures, electrical currents, and actuator positions, from an electro-mechanical system such as an aircraft or other vehicle, may be discrete samples in a time series covering a period of observation. For aircraft, these data are recorded for each flight. Typical sampling rates are 0.25 Hz to 8 Hz for modern commercial aircraft. The recorded values of these data vary substantially over the course of an operational cycle, e.g. during the flight of an aircraft. For example, recorded temperatures could vary by hundreds of degrees depending on variables such as altitude (e.g. ground level versus cruising altitude), operational mode of the equipment, and any dynamic operational control changes applied to the equipment, either automatically or via an explicit operator, e.g. pilot.

Exploration module 216 avoids this obfuscation by dividing the data according to a plurality of phases of the operational cycle before aggregation. For example, sensor data from an aircraft flight may be divided into phases of taxi-out, take-off, climb, cruise, descent, landing, and taxi-in. A range of aggregating functions may then be separately applied to the data associated with each phase, to create phase-dependent aggregate features that can be trended over long periods, e.g. thousands of flights. For instance, the data features may combine phase-dependence and a value constraint or a differential comparison with aggregating statistical functions.

In some examples the module may generate a pre-defined set of data features corresponding to a maintenance event of interest selected by the user. Such a set may include raw attribute data features and/or aggregate data features. For example, if the user selects an overheating event the generated data features may include a temperature sensor reading, an average temperature sensor reading during take-off, a difference in temperature reading between port and starboard sensors, and/or an average difference in temperature reading between port and starboard sensors during take-off.

At step 330, user 228 may define custom data features. In other words, exploration module 216 may receive a mathematical function or other logical ruleset defining a custom data feature from user 228, and generate a data feature accordingly. A GUI 226 of design system 200 may include an interface facilitating input of one or more such rulesets. Custom data features may include representations of recorded time-series sensor data that capture events, transitions, performance metrics, and states of the system under observation. Any custom defined data features may be ranked, visualized, and communicated to machine learning module 218 in the same manner as other data features generated at step 312, such as the pre-defined set of data features.

Exploration module 216 is further configured to categorize maintenance events, at step 314 of process 300. More specifically, the module may divide maintenance events of a selected type into two or more sub-categories based on machine learning analysis of the maintenance data. For example, topic modeling may be applied to text of maintenance logs to divide unplanned replacements of a selected component into a plurality of failure types. The maintenance events, sub-categories, and/or other results of the machine learning analysis may be displayed to user 228 through GUI 226.

At step 332, user 228 may designate health timeframes relative to recorded maintenance events. That is, exploration module 216 may receive one or more time thresholds from the user. For example, user 228 may indicate that components having undergone replacement are healthy for a first time period following replacement, and degraded for a second time period preceding replacement. The exploration module may subdivide operational data into labeled classes or categorizes based on this received designation. In some examples, exploration module 216 may automatically use maintenance event sequences to label the sensor data for the purposes of supervised machine learning, such as classification models for failure prediction.

At step 316, exploration module 216 ranks the importance of some or all of the data features generated in step 312. Importance may be ranked according to one or more quantitative measures of influence of a given data feature on predictive model performance. The ranking may indicate relative importance of the data features in predicting occurrence of a set of historical maintenance events.

The exploration module may use the designations from step 332 in a machine learning method to perform the ranking. In some examples, the user may select one or more data features and one or more maintenance events to be used in the ranking process. The machine learning method may evaluate correlation between data features and maintenance events in an absolute and/or relative sense. For example, the module may iterate supervised classification, eliminating a data feature at each iteration to generate a relative ranking of feature importance.

At step 334, user 228 may use GUI 226 to explore the sensor and maintenance data integrated at step 310. The user may also explore the data features generated at step 312, maintenance event categories generated at step 314, and/or data feature rankings generated at step 316. The user may explore the data in order to identify potential data patterns, pre-cursor signatures, and/or candidate data features useful for creating a predictive maintenance model.

At step 318, Exploration module 216 may visualize and analyze data to aid the user's data exploration. The exploration module is configured to visualize and display both the operational and maintenance data of the historical dataset in a manner that enables a user to discover behavior patterns in large sets of recorded flight sensor data. Flight sensor data and maintenance event data may be displayed overlaid together in one or more graphs and/or charts to allow the user to identify relevant correlations and trends over time. In other words, the exploration module automatically combines the flight data features and maintenance events into a single time series visualization, enabling visual identification of important flight data patterns that are associated with maintenance problems.

As described above with reference to step 312, trending raw sensor data may provide limited insight. Instead, exploration module 216 may display the generated phase-dependent aggregate data features. The health timeframes designated at step 332 may also be displayed relative to each maintenance event. Visualizations may be displayed to the user, and constraints, selections, and other inputs received from the user through GUI 226.

Exploration module 216 may perform automatic analysis of the historical dataset as well as additional analysis as selected by the user. Automatic analysis may include standard statistical measures, detection of potential seasonal bias, and/or any analysis typically relevant to maintenance prediction. In some examples, the analysis automatically performed may depend on the maintenance event of interest selected by the user.

GUI 226 may also provide user 228 control over iteration of steps 312-316, 330, and 332. For example, user 228 may identify a data trend of interest when exploring sensor and maintenance data in step 334 and perform step 330 again to define a related custom data feature, or may begin with step 318 to have the exploration module visualize and analyze data relevant to a data trend of interest before performing step 330 to define a related custom feature. The user may then trigger generation of the defined feature in step 312, and re-ranking of data feature importance in step 316.

At step 336, user 228 may select one or more key data features. That is, exploration module 216 may receive a selection of one or more data features. In some examples, the user may opt for the exploration module to perform an automatic selection of one or more data features. At step 320, the exploration module prepares the selected data features and any relevant related information, as appropriate. Exploration module 216 communicates a set of the data features and labels 233 to machine learning module 218.

Machine learning module 218 is configured to assist user 228 in defining, training, and evaluating candidate algorithms to arrive at a trained anomaly detection model having desired performance traits. The machine learning module may be configured to accommodate users of different levels of expertise and/or allow a user to select a desired level of guidance for a particular project. For example, GUI 226 may include first and second interfaces to the machine learning module.

The first and second interfaces may be designed for beginner and advanced users, or for simplified and complex design, respectively. A user may select the first interface due to limited experience, and/or in order to save time and avoid potential complications such as over-fitting. A user may select the second interface to build and test an algorithm from scratch and/or to create custom algorithm characteristics. In some examples, a user may start with a simple algorithm generated in the first interface, and introduce targeted complexity using tools in the second interface.

At step 338, user 228 may select a template and tune algorithm parameters. For example, the user may select an algorithm template with pre-determined parameters through the first interface, or may select an algorithm type and input all relevant parameters through the second interface. In either case, the machine learning module 218 may receive all necessary details of an anomaly detection algorithm configuration.

Appropriate algorithms may include supervised, unsupervised, or semi-supervised anomaly detection algorithms and techniques such as k-nearest neighbor, support vector machines, Bayesian networks, hidden Markov models, or deep learning. Input parameters and/or model settings may include tuning parameters such as feature data thresholds and relative weighting factors, data pre-processing methods such as smoothing, filtering, and normalization, and alert output criteria such as deviation persistence.

At step 322, the module defines and tests an anomaly detection algorithm based on the algorithm configuration selected at step 338 and the key data features selected in step 336. That is, the module trains and validates a predictive maintenance model. For example, the prepared data features may be divided into complementary training and validation data subsets, and the algorithm trained on the training data subset, then tested on the corresponding validation data subset. In some examples, the machine learning module may receive a selection of training and validation data sets from the user.

The algorithm may be trained and evaluated one or more times, and detailed test results reported to user 228 in GUI 226. Based on the evaluation results, the user may repeat step 338 and trigger a repeat of step 322 by the machine learning module. The GUI may also provide further tools for refining the algorithm, such as alternative training and testing methods and/or error investigation of individual cases.

In some examples, machine learning module 218 may be configured to train and evaluate multiple algorithm configurations, either concurrently or sequentially, and report a comparative analysis in addition to or in place of individual evaluation results. User 228 may repeat steps 338, 322 as necessary until arriving at a satisfactory algorithm configuration. For example, the user may select for desired properties such as high accuracy or low rate of false positives. The user may then trigger step 324 of process 300.

Implementation module 220 is configured to apply the final predictive maintenance model trained by machine learning module 218 to new operational data, detect anomalies in the data, and generate alerts accordingly. Machine learning module 218 may communicate a trained model 234 to implementation module 220, and the implementation module may receive new sensor data 230 from local computer 212. At step 324, the module runs anomaly detection on the new sensor data. The implementation module may then return alerts 232 to the local computer.

Similarly to exploration module 216, implementation module 220 is configured to integrate data saved locally to computer 212. In some examples, the implementation module may also be configured to interface or communicate with external databases or database software. Such connectivity may facilitate ongoing communication with operational databases for automatic generation of maintenance alerts. For instance, remote server 210 may communicate daily with a database of operational data to automatically receive recorded flight data added to the database during maintenance of an aircraft, and issue maintenance alerts before the aircraft returns to service.

B. Illustrative Feature Creation Module

As shown in FIGS. 4-6, this section describes an illustrative feature creation module having a graphical user interface (GUI) 510, and associated computer implemented method of custom feature creation 400. The feature creation module may be part of and/or a sub-module of an exploration module of a predictive maintenance model design system such as exploration module 216, described above. GUI 510 may be an example of GUI 226, as also described above.

The feature creation module is configured to enable a user such as an engineering analyst to define and generate custom data features from large sets of sensor data. Without need for programming expertise, the feature creation module allows the user to specify the rules for extracting data from a sensor dataset and the logic of how these rules are to be combined, as well as constructing a processing function to apply to the extracted data.

In the present example, the feature creation module extracts features from a historical dataset of flight sensor data, digitally recorded by a fleet of aircraft and including data such as temperatures, pressures, electrical currents, and actuator positions. The data include discrete samples in a plurality of time series, each time series recorded over the course of a flight. The historical dataset may also be described as time-labeled operational data. In some examples, the data may be labeled according to a selected time relationship to maintenance events of a corresponding subset of maintenance data, as described further below.

In the present description, the term 'data feature' is used to describe a subset of records of the historical data set, extracted, processed, and/or otherwise prepared for use in a machine learning method. The term 'define' a data feature may describe creating a set of rules or conditions defining which records are included or excluded from the subset and/or mathematically describing processing to be performed. The terms 'calculating' and 'generating' a data feature may include applying the definition to extract and process the subset. 'Creating' a data feature may include both defining and generating the data feature.

GUI 510 allows the user to input a rule set defining a custom aggregate data feature, preview application of the rules to a selected sample flight or flights, and test the defined data feature on a selected sample of labeled flight sensor data. The user, having explored the data using visualization tools such as those described above, may hypothesize that certain data features, when trended over time, will reveal pre-cursor signatures that can signal equipment degradation and failure. The feature creation module may allow rapid investigation of such hypotheses, facilitating identification of data features of importance.

Identified data features of importance may then be extracted from the full historical dataset, and used to train effective predictive models. In some examples, the generated custom data features may be used in training of anomaly detection algorithms to identify component degradation and predict failures in advance. In some examples, the generated custom data features may be used in other machine learning applications for any desired analysis of recorded flight sensor data. For instance, an algorithm may be trained to classify flight activities according to likely wear and tear on one or more aircraft components.

FIG. 4 is a flowchart depicting steps of an illustrative process 400 executed by the feature creation module to generate a custom feature. Selections, values, rules, etc. received by the module in process 400 may be input by the user via GUI 510. Process 400 may also be referred to as a computer implemented method.

Aspects of systems and modules described above, such as the feature creation module and GUI 510, may be utilized in the method steps described below. Where appropriate, reference may be made to components and systems that may be used in carrying out each step. These references are for illustration, and are not intended to limit the possible ways of carrying out any particular step of the method. The flowchart of FIG. 4 may not recite the complete process or all steps of the method. Although various steps of method 400 are described below and depicted in FIG. 4, the steps need not necessarily all be performed, and in some cases may be performed simultaneously or in a different order than the order shown.

In an optional first step 410, a maintenance topic of interest is received from the user. For example, the user may input an Air Transport Association (ATA) Chapter, ATA 100 System Code, or part number. The user may select from a list of maintenance topics displayed in GUI 510, for instance from a drop-down menu. Optional step 412 includes calculating pre-determined aggregate data features corresponding to the received topic. A plurality of pre-determined aggregate data features may be associated with each displayed maintenance topic. The association and/or definition of the pre-determined aggregate data features may be performed by a designer of the feature creation module having expertise in both aircraft maintenance and data science, and/or according to a machine learning method.

As discussed above, trending of recorded sensor data can be difficult due to large variations in sensor values that occur as a result of equipment operational cycles. In the present example, recorded aircraft flight data varies according to flight phases such as taxi-out, climb, cruise, and descent. To address this, the pre-determined features automatically calculated by the feature creation module are dependent on operational phase. The feature creation module includes a standard set of operational phases appropriate for most commercial aircraft. The user may also customize rules defining the operational phases, using GUI 510.

The pre-determined phase-dependent aggregate data features automatically calculated by the feature creation module combine flight phase divisions with aggregating statistical functions such as average, minimum, maximum, standard deviation, median, upper quartile value, and lower quartile value. Examples of features which may be generated by the feature creation module include, but are not limited to, minimum temperature during a climb phase of flight, maximum pressure during a cruise phase of flight, average actuator position during a descent phase of flight, and standard deviation of pump speed during a taxi-out phase of flight.

The automatically-generated data features may also include versions of these more standard features, which compare performance of two different pieces of equipment or measured quantities in the system. Such differential features, which may also be referred to as cross or delta features, may provide more direct anomaly detection by identifying evolving deviations between the performance of different units in the same environment. For example, a delta feature may compare sensor readings between two components of an aircraft, such as left and right engine temperatures.

The feature creation module is further configured to allow the user to tailor the definition of the automatically-generated features and create custom processing functions which may be more complex formulations than the automatically generated features. Such customization may be performed according to steps 414-436 of method 400, as described further below. Examples of customized features for an aircraft system include, but are not limited to, slope of temperature rise during the first five minutes of the climb phase of flight, time to complete flap extension during the descent phase of flight, and accumulated on-time of a pulse-width modulated circuit at altitudes above 30,000 feet.

Users may also extend the predictive application of combining multiple data parameters and/or automatically generated data features from differential comparisons to other arithmetic and/or algebraic combinations. In other words, users may customize automatically generated features and/or define custom features that combine multiple data parameters according to any desired function, including differential comparison. For example, a custom processing function may sum values for a given sensor parameter from sensors associated with four separate but similar components. For another example, a custom processing function may divide an oil pressure reading by a temperature reading.

Figure 5A:
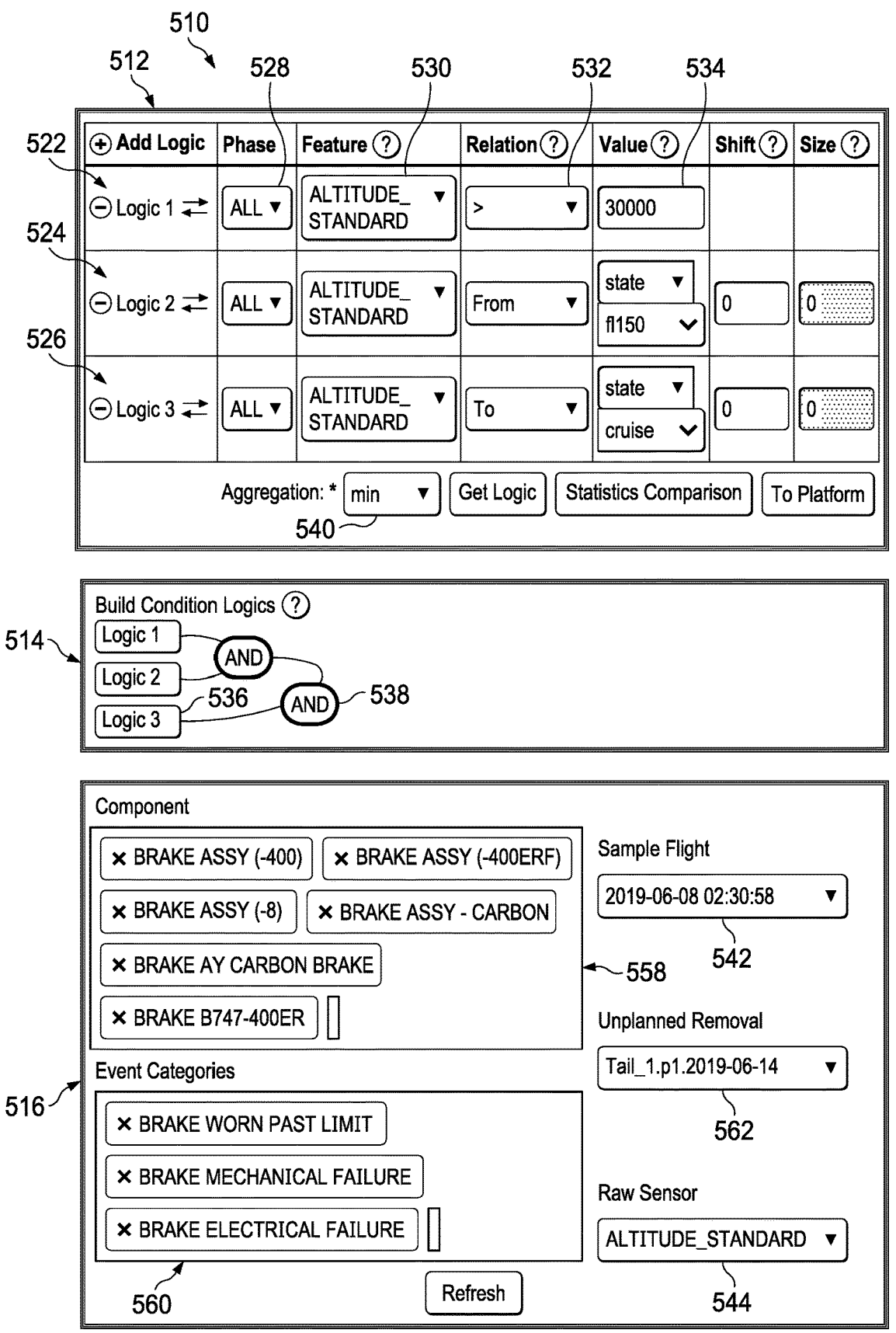
FIG. 5A is a diagram of a first three panes of an illustrative custom data feature creation graphical user interface (GUI).

Step 414 of method 400 includes displaying rule-building tools in a GUI. As depicted in FIG. 5A, GUI 510 includes two panes for input of a set of logical rules defining a custom data feature: a rule pane 512 and a logic pane 514. In pane 512, the user may specify any desired number of logical conditions, or rules, to be applied to recorded flight sensor data. In pane 514 the user may graphically specify a logical combination of the rules of pane 512, using Boolean logic.

Each row in pane 512 constitutes a rule, as defined by selections in each column of the pane. The illustrative rule set depicted in FIG. 5A includes a first rule 522, a second rule 524, and a third rule 526. The user may add additional rules, or remove rules as desired. Each rule includes a phase selection menu 528, a base feature selection menu 530, a constraint definition menu 532, and a value entry element 534.

Each selection made using menus 528-534 or element 534 constrains which records will be extracted from the full historical dataset of recorded flight sensor data. In other words, the selections define the rules, which determine which sensor readings from the historical dataset will be extracted to generate the custom data feature.

Base feature selection menu 530 determines a subset of records from which the custom feature will be generated. The user may use the menu to select one of the pre-determined phase-dependent aggregated features calculated in step 412, or a raw sensor feature. A raw sensor feature may include all records or sensor readings associated with a particular aircraft sensor. In the depicted example, each of rules 522-526 are generated from readings from a standard altitude sensor, or altimeter. The base feature selected for each rule may also be described as a data attribute to be processed by the rule.

Phase selection menu 528 restricts the sensor readings to those taken during the selected phase of flight. In the depicted example, no restriction is made on flight phase. In some examples, the user may select one or more phases for rules 522-526 to define a custom feature that is limited by operational phase. Such a feature may be described as phase-dependent.

Constraint definition menu 532 specifies a type of constraint to be applied, while value entry element 534 defines the relevant value of the constraint. Each rule may define a time range from which to extract sensor data, or define a constraint on the value of the selected base feature. The rules may include any appropriate algebraic and/or statistical calculations.

In first rule 522, a constraint of 'greater than' and a value of '30,000' have been selected. Accordingly the first rule will result in extraction of only sensor readings by the standard altitude sensor having a value of more than 30,000. In second rule 524, a constraint of 'from' and a state of 'fl15000' have been selected. Accordingly the second rule will result in extraction of only sensor readings after the flight reaches flight level 15000. In third rule 526, a constraint of 'to' and a state of 'cruise' have been selected. Accordingly, the third rule will result in extraction of only sensor readings before the flight reaches the cruise phase.

Logic pane 514 allows the user to specify a logical or mathematical combination of rules. The rules defined in pane 512 appear as rule blocks 536, which can be linked together using Boolean operator blocks 538. In the depicted example, blocks 536 representing first rule 522 and second rule 524 are linked by an AND operator block. The rule block representing third rule 526 is in turn linked to the combination of the blocks representing the first and second rules by another AND operator block. Accordingly, all records extracted for the custom data feature will satisfy the constraints of all three rules. Other Boolean operator blocks 538 such as OR, NOR, and NOT may also be available for use in linking rule blocks 536. The user may manipulate the rule and operator blocks, adding and removing operator blocks as needed to achieve a desired rule set.

Each rule defined in rule pane 512 is applied to one data feature or data from one sensor parameter. Through the combination specified in logic pane 514, any number of sensor data parameters may be used in the definition of a custom feature. The rule set may include any Boolean combination of a plurality of constraints on values of selected base features. For example, the parameters of a curve fit performed over a selected time range of the operational data (e.g. coefficients from a polynomial function) may be used to define a custom feature.

Rule pane 512 further allows the user to input details of the aggregation performed on data extracted according to the rules defined in panes 512, 514. In the present example, aggregation is not optional and all custom data features are aggregate. Non-aggregate features from aircraft flight data may be insufficiently useful for the long term trending used in the present example. In other examples, non-aggregate features may be more useful and rule pane 512 may allow aggregation to be selectively applied.

As shown in FIG. 5A, rule pane 512 includes a statistical function selection menu 540 for selection of a standard aggregating function. In the present example, a minimum value function is selected. The accompanying 'Get Logic' and 'Statistics Comparison' buttons may each open a further menu allowing more complex aggregation conditions to be specified.

Step 416 includes receiving a rule set. The received rule set may comprise all selections, entries, and logical combinations from rule pane 512 and logic pane 514. In some examples, the user may trigger receipt of the rule set by use of a 'submit' button or other control element of GUI 510. In the present example, a rule set is received and steps 418-422 performed each time the user interacts with panes 512, 514 to alter the rule set. The user may also submit a name or reference label for the rule set, to allow evaluation of multiple rule sets before finalizing a custom data feature. In some examples a name may be automatically assigned by the feature creation module.

In the depicted example, the received rule set is time-dependent, with the combination of second rule 524 and third rule 526 defining a time range. The rule set further includes a constraint on a value of a first data attribute, and an aggregating statistical function.

GUI 510 includes two additional panes to facilitate visualization of the set of logical rules defined using panes 512, 514. A data pane 516 is depicted in FIG. 5A and a preview pane 518 is depicted in 5B. At step 418, the method includes receiving a selection of a sample of operational data. The selection may be received from a preview sample selection menu 542 of data pane 516. In the present example, menu 542 is a drop-down menu listing all flights in the historical dataset.

Step 420 includes applying the rule set to the selected sample. In other words, the rules defined in rule pane 512 are applied according to the logic of logic pane 514 to the operational data associated with the flight selected in menu 542, without aggregation. In the present example, a subset of altitude readings for the selected flight are extracted.

Step 422 includes displaying the extracted feature data. To provide context for the user, the extracted data are displayed by highlighting the extracted feature data in a sensor data plot 546 of the full flight data, in preview pane 518.

In other words, a preview of the rules specified by the user is illustrated for a sample of flight data, and the user may select which sample flight to display from the historical data. Preview pane 518 updates in real time as the input to panes 512, 514, 516 is altered. The small sample of a single flight may provide feedback to the user as to the effect of the specified rules, while creating sufficiently small computational load as to allow real-time updates. Such responsive visualization may facilitate rapid, flexible design of custom data features.

Sensor data plot 546 has a horizontal time axis 548, and a vertical sensor value axis 550. A value of each sensor reading taken during the selected sample flight by the selected sensor is represented as a data point in the plot. To facilitate visualization, a different symbol shape is used to plot the values for each phase of the flight. For example, in FIG. 5B altitude values recorded during the cruise phase are depicted as squares, but altitude values recording during the descent phase are depicted as triangles.

Data points in sensor data plot 546 that conform to the selected rule set, i.e. the extracted feature data, may be plotted with a different representative symbol or shape. In the present example, the extracted feature data is depicted as highlighted data points 556. Rules defined in rule pane 512 are also depicted as appropriate on sensor data plot 546. In the present example, first rule 522 is shown as a horizontal or value cutoff line 552. Second rule 524 and third rule 526 are depicted as a highlighted vertical or time range 554. Sensor readings above cutoff line 552 and inside range 554 are highlighted.

Decision 424 of method 400 may be received from the user. That is, until the user triggers a test (TEST=NO), the feature creation module may continue to perform steps 416-422, receiving modified rule sets and displaying resultant previews. Once the user is satisfied with the rule set (TEST=YES), the user may use a button or other interactive element of GUI 510 to proceed with method 400 and step 426.

Step 426 includes receiving a selection of maintenance events. The maintenance events may be selected by the user in data pane 516. Data pane 516 includes a component selection box 558, an event category selection box 560, and a failure event selection menu 562. The user may use the boxes and menu to select a subset of maintenance events from historical maintenance data for the fleet of aircraft. Maintenance events may include component failure, unplanned component removal, or any other maintenance data records of interest.

Step 428 includes creating two samples of operational data labeled based on the selected maintenance events. More specifically, two sets of sample flights are created. A first set is randomly selected from flights having a first label, and a second set is randomly selected from flights having a second label. Each set may include the same number of flights, and the number of flights may be received from the user.

The feature creation module may create or receive labels for records associated with the sensor selected in menu 544 of data pane 516. In some examples, a feature evaluation module of a predictive maintenance model design system may provide labels and/or labeled data to the feature creation module. The sensor data may be labeled according to a time-relationship with the selected maintenance events and/or in any manner indicative of aircraft and/or component health.

For example, the user may input a time range relative to a maintenance event, such as a first time threshold of x-number of days and a second time threshold of y-number of days. The time range may indicate healthy and degraded periods for the relevant component or system. In other words, sensor data in a period of time greater than x-number of days prior to the maintenance event may be assumed healthy, while sensor data in a period of time less than y-number of days prior to the maintenance event may be assumed degraded. The sensor data may be accordingly labeled with first and second qualitative labels such as 'healthy' and 'degraded'.

The feature creation module may select a subset of a pre-determined size. If the feature creation module is performing labeling, the subset may be of unlabeled data and the module may then label the selected subset. If the feature creation module is receiving labeled data from another module, the selected subset may be of labeled data. The subset may be split into two samples, the first sample including flights having the 'healthy' label and the second sample including flights having the 'degraded' label.

Step 430 includes applying the rule set to the two created samples. In other words, the feature creation module extracts the custom feature data from the first and second samples, according to the received rule set. Step 432 then includes displaying a comparison of the extracted feature data, between samples. As shown in FIG. 6, in the present example the comparison is displayed in test plot 520. The test plot compares application of the ruleset to the healthy sample group and the degraded sample group. The user may use this plot to assess whether or not the distribution of the data feature is different when comparing the two groups, and therefore whether the data feature is likely to be indicative of component health or predictive of maintenance events.

As shown in FIG. 6, a plot selection box 572 and rule set selection box 574 allow the user to select a desired type of plot or plots, and one or more previously defined rule sets to test. In the depicted example, test plot 520 includes a density plot with a horizontal custom feature value axis 564 and a vertical density axis 566. Extracted feature data 568 from the healthy sample group and extracted feature data 570 from the degraded sample group are plotted separately. The user may further select a box plot or other comparative plot to display in addition to or instead of the density plot.

At decision 434, If the user is satisfied (CONFIRM=YES) with the rule set defining the custom data feature, then they may choose to proceed with step 436. Otherwise (CONFIRM=NO), the method may continue with steps 416-432 until the user is satisfied. That is, the user may make changes to the rule set in panes 512, 514 until a satisfactory result is achieved. Displaying a preview and a test of the new custom feature data prior to running the feature extraction over the entire historical data set may allow the user to check that the rules work as desired and are related to a meaningful pattern before committing processing resources for a full run, which may in turn save computation costs and user time.

Step 436 includes applying the rule set to the full historical dataset. The user may select a relevant sensor in a sensor selection menu 544 of data pane 516. The final received ruleset may be used to extract and aggregate data from the selected sensor parameter. The feature creation model may process the recorded flight sensor data and transform it into an aggregated operational-phase feature that can be trended over time and used for model training. The extracted custom data feature data may be stored by a predictive maintenance model design system for access by other modules. For example, the custom data feature may be accessible by a other modules of a predictive maintenance model design system such as exploration module 216, for further visualization and analysis such as feature ranking.

At step 438 the method includes providing the extracted feature data to a machine learning module, such as module 218, described above. In some examples, the feature creation module may output the extracted feature data for use with independent machine learning software, or access by custom-written model training code.

The user may create any desired number of custom data features, by repetition of method 400. The user may also edit and refine a previously created custom data feature by repeating the method.

C. Illustrative Data Processing System

Figure 7:
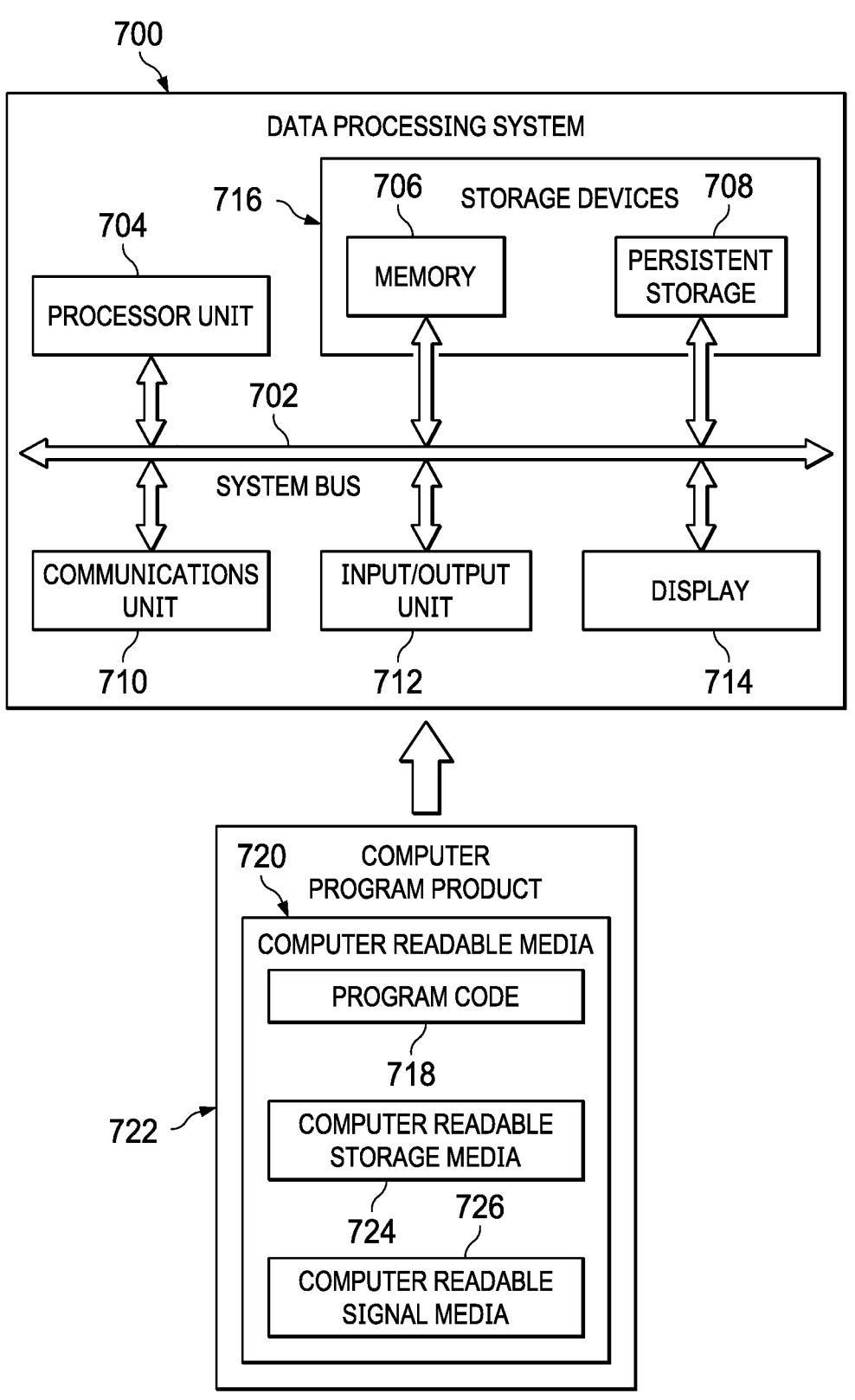
FIG. 7 is a schematic diagram of an illustrative data processing system suitable for use with aspects of the present disclosure.

As shown in FIG. 7, this example describes a data processing system 700 (also referred to as a computer, computing system, and/or computer system) in accordance with aspects of the present disclosure. In this example, data processing system 700 is an illustrative data processing system suitable for implementing aspects of the predictive maintenance model generation and custom feature creation methods described above. More specifically, in some examples, devices that are examples of data processing systems (e.g., servers, tablets, personal computers) may run one or more modules of a predictive maintenance model design system to execute the methods described above.

In this illustrative example, data processing system 700 includes a system bus 702 (also referred to as communications framework). System bus 702 may provide communications between a processor unit 704 (also referred to as a processor or processors), a memory 706, a persistent storage 708, a communications unit 710, an input/output (I/O) unit 712, and/or a display 714.

Processor unit 704 serves to run instructions that may be loaded into memory 706. Processor unit 704 may comprise a number of processors, a multi-processor core, and/or a particular type of processor or processors (e.g., a central processing unit (CPU), graphics processing unit (GPU), etc.), depending on the particular implementation. Further, processor unit 704 may be implemented using a number of heterogeneous processor systems in which a main processor is present with secondary processors on a single chip.

Memory 706 and persistent storage 708 are examples of storage devices 716. A storage device may include any suitable hardware capable of storing information (e.g., digital information), such as data, program code in functional form, and/or other suitable information, either on a temporary basis or a permanent basis. Storage devices 716 also may be referred to as computer-readable storage devices or computer-readable media.

Persistent storage 708 may contain one or more components or devices. For example, persistent storage 708 may include one or more devices such as a magnetic disk drive (also referred to as a hard disk drive or HDD), solid state disk (SSD), an optical disk drive such as a compact disk ROM device (CD-ROM), flash memory card, memory stick, and/or the like, or any combination of these. One or more of these devices may be removable and/or portable, e.g., a removable hard drive.

Input/output (I/O) unit 712 allows for input and output of data with other devices that may be connected to data processing system 700 (i.e., input devices and output devices). For example, an input device may include one or more pointing and/or information-input devices such as a keyboard, a mouse, touch screen, microphone, digital camera, and/or the like. These and other input devices may connect to processor unit 704 through system bus 702 via interface port(s) such as a serial port and/or a universal serial bus (USB).

Output devices may use some of the same types of ports, and in some cases the same actual ports, as the input device(s). For example, a USB port may be used to provide input to data processing system 700 and to output information from data processing system 700 to an output device. Some output devices (e.g., monitors, speakers, and printers, among others) may require special adapters. Display 714 may include any suitable human-machine interface or other mechanism configured to display information to a user, e.g., a CRT, LED, or LCD monitor or screen, etc.

Communications unit 710 refers to any suitable hardware and/or software employed to provide for communications with other data processing systems or devices. While communication unit 710 is shown inside data processing system 700, it may in some examples be at least partially external to data processing system 700. Communications unit 710 may include internal and external technologies, e.g., modems, ISDN adapters, and/or wired and wireless Ethernet cards, hubs, routers, etc. Data processing system 700 may operate in a networked environment, using logical connections to one or more remote computers.

Instructions for the operating system, applications, and/or programs may be located in storage devices 716, which are in communication with processor unit 704 through system bus 702. In these illustrative examples, the instructions are in a functional form in persistent storage 708. These instructions may be loaded into memory 706 for execution by processor unit 704. Processes of one or more examples of the present disclosure may be performed by processor unit 704 using computer-implemented instructions, which may be located in a memory, such as memory 706.

These instructions are referred to as program instructions, program code, computer usable program code, or computer-readable program code executed by a processor in processor unit 704. The program code in the different examples may be embodied on different physical or computer-readable storage media, such as memory 706 or persistent storage 708. Program code 718 may be located in a functional form on computer-readable media 720 that is selectively removable and may be loaded onto or transferred to data processing system 700 for execution by processor unit 704. Program code 718 and computer-readable media 720 form computer program product 722 in these examples. In one example, computer-readable media 720 may comprise computer-readable storage media 724 or computer-readable signal media 726.

Computer-readable storage media 724 may include, for example, an optical or magnetic disk that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory, that is connected to data processing system 700. In some instances, computer-readable storage media 724 may not be removable from data processing system 700.

In these examples, computer-readable storage media 724 is a non-transitory, physical or tangible storage device used to store program code 718 rather than a medium that propagates or transmits program code 718. Computer-readable storage media 724 is also referred to as a computer-readable tangible storage device or a computer-readable physical storage device. In other words, computer-readable storage media 724 is media that can be touched by a person.

Alternatively, program code 718 may be transferred to data processing system 700, e.g., remotely over a network, using computer-readable signal media 726. Computer-readable signal media 726 may be, for example, a propagated data signal containing program code 718. For example, computer-readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative examples, program code 718 may be downloaded over a network to persistent storage 708 from another device or data processing system through computer-readable signal media 726 for use within data processing system 700. For instance, program code stored in a non-transitory computer-readable storage medium in a server data processing system may be downloaded over a network from the server to data processing system 700. The computer providing program code 718 may be a server computer, a client computer, or some other device capable of storing and transmitting program code 718.

The different components illustrated for data processing system 700 are not meant to provide architectural limitations to the manner in which different examples may be implemented. One or more examples of the present disclosure may be implemented in a data processing system that includes fewer components or includes components in addition to and/or in place of those illustrated for computer 700.

Other components shown in FIG. 7 can be varied from the examples depicted. Different examples may be implemented using any hardware device or system capable of running program code.

Illustrative Combinations and Additional Examples

This section describes additional aspects and features of predictive maintenance model design systems, computer implemented methods of predictive maintenance design, and computer programs product for generating predictive maintenance models, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A data processing system for generating predictive maintenance models, comprising:

one or more processors;

a memory including one or more digital storage devices; and a plurality of instructions stored in the memory and executable by the one or more processors to:

receive a historical dataset relating to each system of a plurality of systems, the historical dataset including maintenance data and operational data, receive a rule set for processing a first attribute of the operational data, calculate a custom data feature from the historical dataset according to the received rule set, generate a predictive maintenance model, using the custom feature according to a machine learning method.

A1. The data processing system of A0, wherein the plurality of instructions are further executable by the one or more processors to:

calculate a preview of the custom data feature from a subset of the operational data of the historical dataset according to the received rule set, and display the preview of the custom data feature in a graphical user interface.

A2. The data processing system of A1, wherein the plurality of instructions are further executable by the one or more processors to receive a selection of the subset of the operational data.

A3. The data processing system of any of A0-A2, wherein the plurality of instructions are further executable by the one or more processors to:

calculate the custom data feature from a first sample of labeled data and a second sample of labeled data according to the received rule set, and display a comparison of the custom data feature for the first sample and the second sample, wherein the first and second samples of labeled data are subsets of the operational data of the historical dataset, labeled according to a corresponding subset of maintenance data of the historical dataset.

A4. The data processing system of A3, wherein the first and second samples of labeled data are labeled according to a selected time relationship to maintenance events of the corresponding subset of maintenance data.

A5. The data processing system of A3, wherein the plurality of instructions are further executable by the one or more processors to:

receive a selection of maintenance events of the maintenance data of the historical dataset, and create the first and second samples of labeled data, the first and second samples being labeled according to a time relationship to the selected maintenance events.

A6. The data processing system of any of A3-A5, wherein the data of the first sample are labeled with a first qualitative label, and the data of the second sample are labeled with a second qualitative label different from the first qualitative label.

A7. The data processing system of any of A0-A6, wherein the rule set includes one or more rules defining a constraint on a value of the first data attribute.

A8. The data processing system of A7, wherein the one or more rules are mathematically combined.

A9. The data processing system of A7 or A8, wherein the rule set is a Boolean combination of a plurality of constraints on values of attributes of the operational data including the first attribute.

A10. The data processing system of any of A0-A9, wherein the rule set is also for processing at least a second attribute of the operational data, and the custom data feature is an aggregate data feature.

A11. The data processing system of A10, wherein the rule set includes a combination of a first rule for processing the first attribute and a second rule for processing the second attribute.

A12. The data processing system of A10 or A11, wherein the rule set includes an algebraic combination of the first and second operational data attributes.

A13. The data processing system of any of A0-A12, wherein the rule set includes a curve fitting calculation.

A14. The data processing system of A13, wherein the custom data feature is a parameter from the calculated curve, the curve fitting calculation being performed over a selected time range of the operational data.

A15. The data processing system of any of A0-A14, wherein the custom data feature is a differential comparison between at least two components of each system.

A16. The data processing system of any of A0-A15, wherein the custom data feature includes an algebraic combination of at least two operational data parameters.

A17. The data processing system of any of A0-A16, wherein the custom data feature is an algebraic combination of multiple sensor readings.

A18. The data processing system of any of A0-A17, wherein the custom data feature includes a combination of readings from multiple sensors associated with a single component.

A16. The data processing system of any of A0-A15, wherein the operational data is time-labeled, and the rule set is time-dependent.

A17. The data processing system of A16, wherein the rule set includes one or more rules defining a time range from which to extract operational data.

A18. The data processing system of any of A0-A17, wherein the plurality of systems are a fleet of aircraft.

A19. The data processing system of any of A0-A18, wherein the plurality of instructions are further executable by the one or more processors to:

display the calculated custom data feature in a graphical user interface.

A20. The data processing system of any of A0-A19, wherein the plurality of instructions are further executable by the one or more processors to:

calculate a plurality of pre-determined aggregate data features from the operational data, and display the calculated data features in a graphical user interface.

A21. The data processing system of A20, wherein the plurality of systems have multiple operational phases, and the pre-determined aggregate data features are dependent on operational phase.

A22. The data processing system of A20 or A21, wherein the pre-determined aggregate data features are calculated according to one or more aggregating statistical functions.

A23. The data processing system of any of A20-A22, wherein the pre-determined aggregate data features include a differential comparison between at least two different components of each system.

B0. A computer implemented method of generating a predictive maintenance model, comprising:

receiving a historical dataset relating to each system of a plurality of systems, the historical dataset including maintenance data and operational data, receiving a rule set for processing a first attribute of the operational data, calculating a custom data feature from the historical dataset according to the received rule set, generating a predictive maintenance model, using the custom feature according to a machine learning method.

B1. The computer implemented method of B0, further comprising:

calculating the custom data feature from a first sample of labeled data and a second sample of labeled data according to the received rule set, and displaying a comparison of the custom data feature for the first sample and the second sample, wherein the first and second samples of labeled data are subsets of the operational data of the historical dataset, labeled according to a corresponding subset of maintenance data of the historical dataset.

B2. The computer implemented method of B1, wherein the first and second samples of labeled data are labeled according to a selected time relationship to the maintenance events of the corresponding subset of maintenance data.

C0. A computer program product for generating predictive maintenance models, the computer program product comprising:

a non-transitory computer-readable storage medium having computer-readable program code embodied in the storage medium, the computer-readable program code configured to cause a data processing system to generate a predictive maintenance model, the computer-readable program code comprising:

at least one instruction to receive a historical dataset relating to each system of a plurality of systems, the historical dataset including maintenance data and operational data, at least one instruction to receive a rule set for processing a first attribute of the operational data, at least one instruction to calculate a custom data feature from the historical dataset according to the received rule set, and at least one instruction to generate a predictive maintenance model, using the custom feature according to a machine learning method.

C1. The computer program product of C0, further comprising:

at least one instruction to calculate the custom data feature from a first sample of labeled data and a second sample of labeled data according to the received rule set, and at least one instruction to display a comparison of the custom data feature for the first sample and the second sample, wherein the first and second samples of labeled data are subsets of the operational data of the historical dataset, labeled according to a selected time relationship to the maintenance events of a corresponding subset of maintenance data.

Advantages, Features, and Benefits

The different examples of the predictive maintenance model design system described herein provide several advantages over known solutions for using machine learning models to forecast maintenance. For example, illustrative examples described herein allow creation of models for effective maintenance forecasting without programming or data science expertise.

Additionally, and among other benefits, illustrative examples described herein facilitate identification of relevant data patterns and precursor signatures in a large and complex dataset.

Additionally, and among other benefits, illustrative examples described herein allow creation of data features targeting such identified patterns and signatures.

Additionally, and among other benefits, illustrative examples described herein allow preview and testing of data features on a limited data sample, for real-time feedback and rapid evaluation.

No known system or device can perform these functions, particularly in a complex dataset based on recorded telemetry from equipment cycling through multiple operational phases. Thus, the illustrative examples described herein are particularly useful for aircraft maintenance forecasting. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A data processing system for generating predictive maintenance models, comprising:

one or more processors;

a memory including one or more digital storage devices; and a plurality of instructions stored in the memory and executable by the one or more processors to:

receive a historical dataset relating to each system of a plurality of systems, wherein the plurality of systems includes a fleet of aircraft, and wherein the historical dataset includes maintenance data and operational data associated with the fleet of aircraft;

receive a rule set for processing a first attribute of the operational data;

calculate a custom data feature from the historical dataset according to the received rule set;

calculate the custom data feature from a first sample of labelled data and a second sample of labelled data according to the received rule set, wherein the first sample of labelled data is randomly selected from flights having a first label, and the second sample of labelled data is randomly selected from flights having a second label;

display a comparison of the custom data feature for the first sample and the second sample, wherein the first sample of labelled data and the second sample of labelled data are, respectively, subsets of the operational data of the historical dataset, labelled according to a corresponding subset of maintenance data of the historical dataset;

generate a predictive maintenance model using the custom data feature according to a machine learning method based on receiving approval from the display;

receive additional operational data;

input the additional operational data to the predictive maintenance model;

implement the predictive maintenance model; and cause an action to occur based on implementing the predictive maintenance model, wherein the action includes one or more of: generate an alert for detected anomalies or preventative maintenance action.

2. The data processing system of claim 1, wherein the plurality of instructions are further executable by the one or more processors to:

calculate a preview of the custom data feature from a subset of the operational data of the historical dataset according to the received rule set, and display the preview of the custom data feature in a graphical user interface.

3. The data processing system of claim 2, wherein the plurality of instructions are further executable by the one or more processors to receive a selection of the subset of the operational data.

4. The data processing system of claim 1, wherein the first sample of labelled data and the second sample of labelled data are labelled according to a time relationship to maintenance events of the corresponding subset of maintenance data.

5. The data processing system of claim 1, wherein the plurality of instructions are further executable by the one or more processors to:

receive a selection of maintenance events of the maintenance data of the historical dataset, and create the first sample of labelled data and the second sample of labelled data, the first sample of labelled data and second sample of labelled data being labelled according to a time relationship to the selected maintenance events.

6. The data processing system of claim 1, wherein the data of the first sample of labelled data are labelled with a first qualitative label, and the data of the second sample of labelled data are labelled with a second qualitative label different from the first qualitative label.

7. The data processing system of claim 1, wherein the rule set includes one or more rules defining a constraint on a value of the first-attribute.

8. The data processing system of claim 1, wherein the rule set includes one or more rules defining a constraint on a value of the first attribute, and wherein the rule set is a Boolean combination of a plurality of constraints on values of attributes of the operational data including the first attribute.

9. The data processing system of claim 7, wherein the rule set further includes one or more aggregating statistical functions.

10. The data processing system of claim 1, wherein the rule set is also for processing at least a second attribute of the operational data, and the custom data feature is an aggregate data feature.

11. The data processing system of claim 10, wherein the rule set includes a combination of a first rule for processing the first attribute and a second rule for processing the second attribute.

12. The data processing system of claim 1, wherein the custom data feature is a differential comparison between or an algebraic combination of at least two sensors of each system.

13. The data processing system of claim 1, wherein the operational data is timelabeled, and the rule set is time-dependent.

14. The data processing system of claim 13, wherein the rule set includes one or more rules defining a time range from which to extract operational data.

15. The data processing system of claim 1, wherein the plurality of instructions are further executable by the one or more processors to:

calculate a plurality of pre-determined aggregate data features from the operational data.

16. The data processing system of claim 15, wherein the plurality of systems have multiple operational phases, and the pre-determined aggregate data features are dependent on an operational phase of the multiple operational phases.

17. The data processing system of claim 1, wherein the plurality of systems are a fleet of aircraft.

18. A computer implemented method of generating a predictive maintenance model, comprising:

receiving, by a device, a historical dataset relating to each system of a plurality of systems, wherein the plurality of systems includes a fleet of aircraft, and wherein the historical dataset includes maintenance data and operational data;

receiving, by the device, a rule set for processing a first attribute of the operational data;

calculating, by the device, a custom data feature from the historical dataset according to the received rule set;

calculating, by the device, the custom data feature from a first sample of labelled data and a second sample of labelled data according to the received rule set, wherein the first sample of labelled data is randomly selected from flights having a first label, and the second sample of labelled data is randomly selected from flights having a second label;

displaying, by the device, a comparison of the custom data feature for the first sample of labelled data and the second sample of labelled data, wherein the first sample of labelled data and second sample of labelled data are subsets of the operational data of the historical dataset, labelled according to a corresponding subset of maintenance data of the historical dataset;

generating, by the device, a predictive maintenance model using the custom feature according to a machine learning method;

receiving, by the device, additional operational data;

inputting, by the device, the additional operational data to the predictive maintenance model;

implementing, by the device, the predictive maintenance model; and causing, by the device, a preventative maintenance action to occur based on implementing the predictive maintenance model.

19. A computer program product for generating predictive maintenance models, the computer program product comprising:

a non-transitory computer-readable storage medium having computer-readable program code embodied in the storage medium, the computer-readable program code configured to cause a data processing system to generate a predictive maintenance model, the computer-readable program code configured to:

receive a historical dataset relating to each system of a plurality of systems, wherein the plurality of systems includes a fleet of aircraft, and wherein the historical dataset includes maintenance data and operational data;

receive a rule set for processing a first attribute of the operational data;

calculate a custom data feature from the historical dataset according to the received rule set;

calculate the custom data feature from a first sample of labelled data and a second sample of labelled data according to the received rule set, wherein the first sample of labelled data is randomly selected from flights having a first label, and the second sample of labelled data is randomly selected from flights having a second label;

display a comparison of the custom data feature for the first sample of labelled data and the second sample of labelled data, wherein the first sample of labelled data and second sample of labelled data are subsets of the operational data of the historical dataset, labelled according to a corresponding subset of maintenance data of the historical dataset;

generate a predictive maintenance model using the custom feature according to a machine learning method;

receive additional operational data;

input the additional operational data to the predictive maintenance model;

implement the predictive maintenance model; and cause preventative maintenance action based on implementing the predictive maintenance model, wherein the preventative maintenance action includes one or more of:

an inspection of equipment, testing of the equipment, repair of the equipment, or replacement of the equipment.

20. The data processing system of claim 1, wherein the first sample of labelled data and the second sample of labelled data include a same number of flights.

\* \* \* \* \*